(No Model.)

J. D. BULTZ & G. REITER.
CHAIN GEAR FOR VEHICLES.

No. 580,369.  Patented Apr. 13, 1897.

Witnesses
James L. Foley
[signature]

Inventors
John D. Bultz
George Reiter
by L. M. Hosea Attorney

THE NORRIS PETERS CO., PHOTO-LITHO., WASHINGTON, D. C.

UNITED STATES PATENT OFFICE.

JOHN D. BULTZ AND GEORGE REITER, OF CINCINNATI, OHIO.

CHAIN-GEAR FOR VEHICLES.

SPECIFICATION forming part of Letters Patent No. 580,369, dated April 13, 1897.

Application filed August 24, 1896. Serial No. 603,704. (No model.)

*To all whom it may concern:*

Be it known that we, JOHN D. BULTZ and GEORGE REITER, citizens of the United States, residing at Cincinnati, Ohio, have invented new and useful Improvements in Chain-Gears for Vehicles, of which the following is a specification.

Our invention relates to chain-gears, particularly to the class of such gears in which a chain with elevated sprockets is employed, having a resting-support upon a driven wheel of small diameter, but engaging for propulsion a wheel of larger diameter. In such constructions (an example of which is shown as applied to a bicycle in pending application, Serial No. 589,179, heretofore filed by us) the elevated sprocket-links of the chain, being carried forward over the driving sprocket-wheel propelled by the foot-levers, constitute an obstruction liable to catch in the clothing or foot-gear of the rider; and the object of our invention is to avoid this difficulty and also to economize the cost and weight of the propelling-chain.

To this end our invention consists in the construction of a sprocket band or chain, as herein described, and the combination therewith of the ordinary link chain, such as commonly used, together employed as a means of driving a disk wheel such as described in said pending application.

Mechanism embodying our invention is illustrated in the accompanying drawings, in which—

Figure 1:
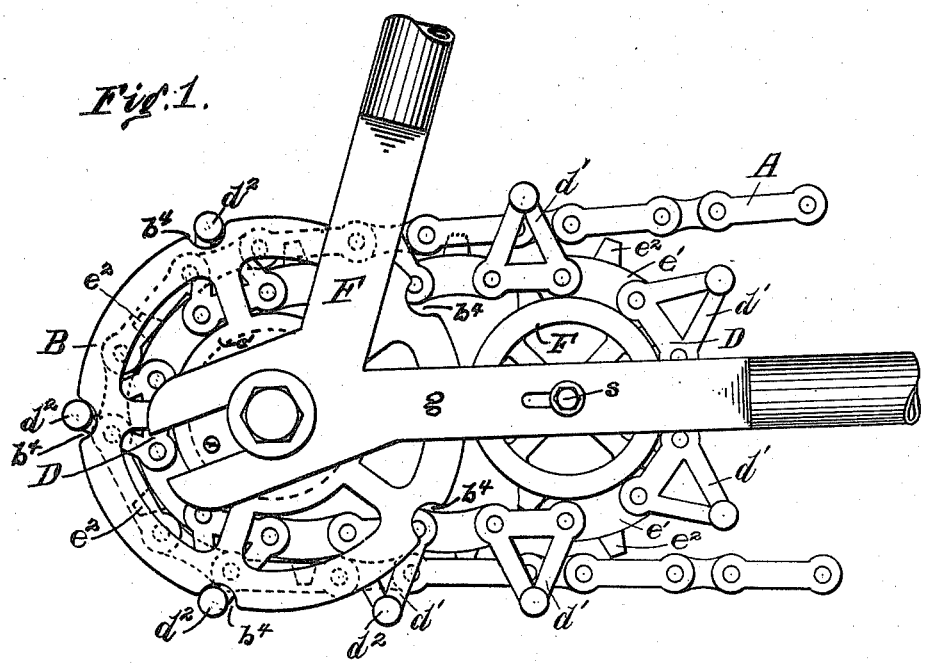
Figure 3:
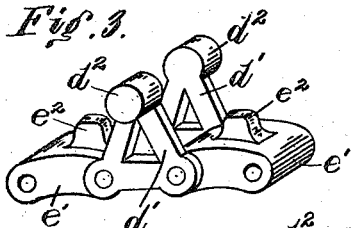
Figure 2:
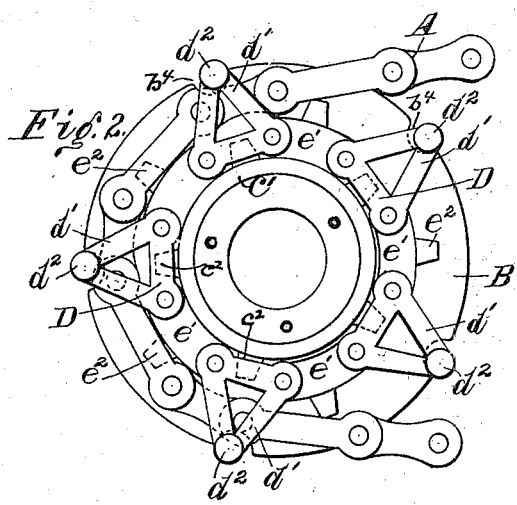
Figure 4:
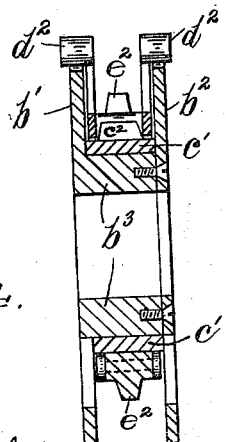

Figure 1 is a side elevation of our invention complete as applied to a bicycle. Fig. 2 is a similar side elevation showing a modified construction. Fig. 3 is a perspective view of part of the band, showing construction; and Fig. 4, a radial cross-section of the disk-wheel and sprocket-band, showing construction.

Referring now to the drawings, A designates the usual propelling-chain of a bicycle, constructed of alternate open and closed links engaged by a sprocket-wheel (not shown) propelled by foot-levers in the customary manner, and B a disk-wheel rigidly attached to the hub of the rear bearing-wheel (not shown) of the bicycle-frame F.

The wheel B is constructed of two parallel disks $b'$ $b^2$, connected by a hub $b^3$, as shown. Upon the hub $b^3$ is fitted a loose collar $c'$, provided with centering-sprockets $c^2$, its function being to furnish a rest-bearing at its periphery for a linked sprocket-band D, presently to be described, and hold it by means of the sprockets $c^2$ against side displacement. The collar $c'$ is free to rotate loosely on the hub $b^3$ between the disks.

The sprocket-band D is constructed, as indicated in Fig. 3, of triangular side plates $d'$, each having at the apex an outwardly-projecting stud $d^2$, each two opposite side plates being spaced apart and connected across at each end of the base by pivot-studs passing through intervening links $e'$, each of the latter being provided with a sprocket $e^2$, rising outwardly. The sprocket-band thus formed passes around the rear half of the collar $c'$, on whose periphery it has a rest-bearing, and is laterally centered in relation to the disks by the sprockets $c^2$, which enter between the triangular plates. Instead of sprockets the collar may have a centering-groove for this purpose. The lateral studs $d^2$ of the triangular plates project outwardly and engage in recesses $b^4$ in the periphery of the disks, these recesses being of such depth that the studs $d^2$ are in contact only at one side and never at the bottom of the recesses.

An ordinary sprocket-wheel idler F is arranged forward of the wheel B, over which the band D is carried. The idler F is set upon an adjustable pivot-stud $s$, secured in the adjacent rear fork $g$ of the bicycle-frame, and carries the outer bight of the sprocket-band, the object being to support the unused portion of the band, regulate the tension, and facilitate its detachment from the propelling-chain in action.

The driving-chain A enters between the triangular plates of the sprocket-band D and engages the sprockets $e^2$ of the links $e'$ in the usual manner of sprocket engagement. The driving power of the chain A is thus transmitted to the sprocket-band D and through the latter to the disks of the wheel B at the contact-points of the studs $d^2$.

We find, among other advantages of this construction, a practical remedy for the ordinary friction of the chain, due to the freedom of the parts to accommodate any inaccuracy of workmanship, unequal wear, &c.

We claim as our invention and desire to secure by Letters Patent of the United States—

1. The chain band herein described, consisting of alternate links as follows: (first) a link composed of two opposite triangular plates having outwardly-projecting studs at their apexes, and (second) a link having an upwardly-projecting sprocket and connecting the pairs of plates between and in the line of their bases, substantially as set forth.

2. In a chain driving-gear, the combination of a grooved driven pulley; a chain band having a rest-bearing in the groove of same, and lateral sprockets on the chain band engaging the side walls of the groove; and a driven chain passing in a bight in the groove of the driven pulley seated upon and engaging the chain band, substantially as set forth.

3. In a chain driving-gear the combination of a grooved pulley, a loose guide-collar carried in the groove of said pulley, a chain band carried over and resting upon said collar between the walls of the groove, said chain being provided with radial sprockets, and with lateral sprockets engaging in recesses of the outer walls of the groove, and an open-linked driving-chain carried around the pulley on the back of said chain band and engaging the radial sprockets of the latter, substantially as set forth.

In testimony whereof we have hereunto set our hands in the presence of two subscribing witnesses.

JOHN D. BULTZ.
GEORGE REITER.

Witnesses:
L. M. HOSEA,
JAMES L. FOLEY.